Figure 1:
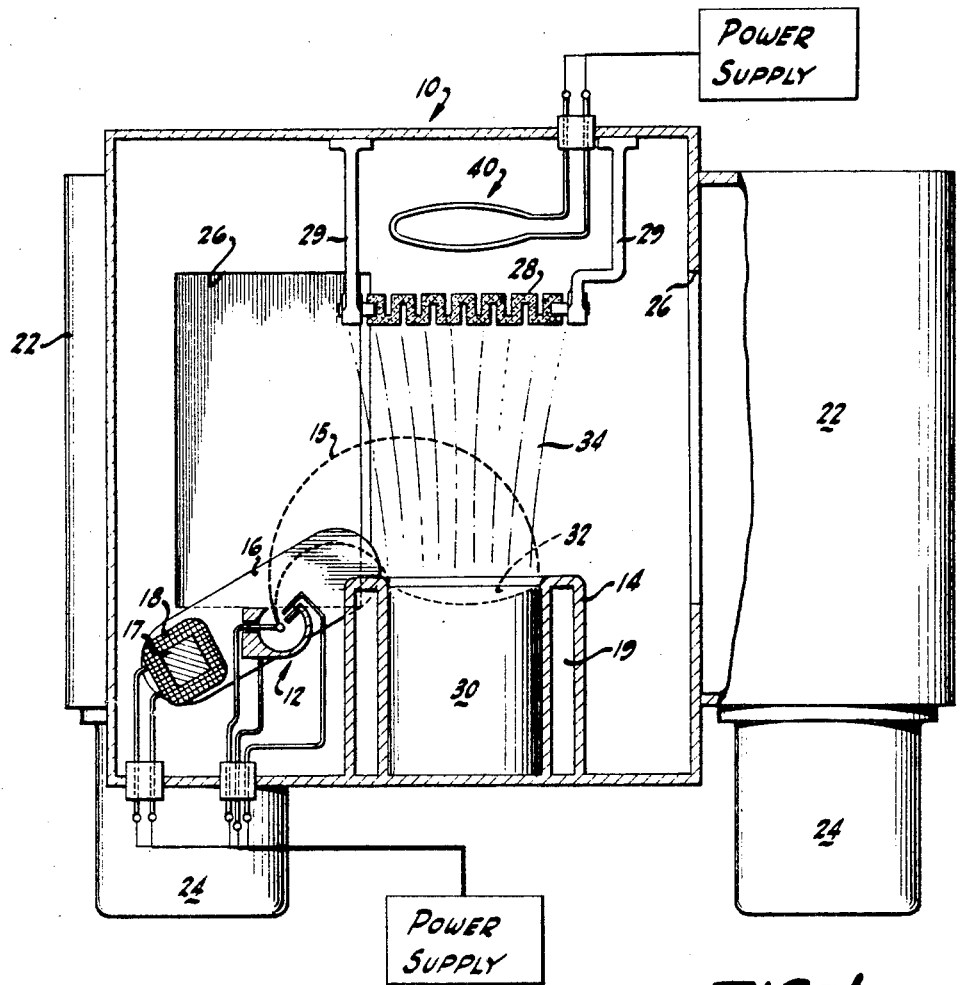

Jan. 18, 1966  H. R. SMITH, JR  3,230,110

METHOD OF FORMING CARBON VAPOR BARRIER

Filed Jan. 22, 1962

INVENTOR.
HUGH R. SMITH, JR.
BY
Lippincott, Ralls & Hendrickson
ATTORNEYS

United States Patent Office 3,230,110
Patented Jan. 18, 1966

3,230,110
METHOD OF FORMING CARBON
VAPOR BARRIER
Hugh R. Smith, Jr., Piedmont, Calif., assignor to Temescal
Metallurgical Corporation, Richmond, Calif., a corporation of California
Filed Jan. 22, 1962, Ser. No. 167,857
6 Claims. (Cl. 117—228)

This invention relates to a method of forming a vapor barrier for a carbon body and the product of same and, more particularly, to a method of encasing a carbon body in an imperforate shell of a stable metal carbide which forms an effective vapor barrier and retainer of the carbon body.

It is well recognized that carbon has certain characteristics that would render it well suited for use as an electrical resistance heating element for stoves, furnaces and the like, if it did not vaporize so rapidly at high temperatures. Carbon has a high degree of resistivity, it is easily obtainable at relatively low expense, and it is easy to shape and machine into particular configurations for various heating installations. However, it tends to defeat its own purpose in that the heat it generates promotes its own sublimation. Consequently, there is a real need in industry for some means which will obviate the effects of carbon sublimation to permit more extensive use of the material as a heating element, capable of generating high temperatures.

It is, therefore, an object of this invention to provide a method of forming a barrier for blocking the vaporization of carbon, particularly at high temperatures.

It is a further object of this invention to provide a substantially imperforate stable barrier to encase a carbon body and retain the carbon against rapid vaporization loss.

It is a further object of this invention to provide a carbon heating element encased in a protective vapor barrier of an imperforate material which has a characteristic high melting point and which is not susceptible to rapid vaporization.

According to the method of this invention, a body of carbon which has been formed into the configuration desired for use as a heating element is introduced into a furnace in which a high degree of vacuum is maintained. In a suitable crucible within the furnace enclosure a metal is subjected to temperatures sufficient to produce rapid vaporization thereof. The metal selected should be one the carbide of which has a high melting point and is stable with little tendency to vaporize rapidly, many of the so-called refractory metals being particularly suited for this purpose. The metal is heated to a temperature at which it vaporizes rapidly, and in extremely high vacuum within the furnace, the vapor molecules are released evenly over the surface of the molten metal and rise in virtually unobstructed paths from the molten surface to impinge against the carbon heating element uniformly over the surface thereof. In the meantime, the carbon is heated to a sufficiently high temperature to promote and accelerate combination with the metallic vapors but below that at which the carbon vaporizes rapidly, until a continuous coating of the carbide of the refractory metal is formed over the carbon body. The carbide coating generally has a melting point higher than that of the refractory metal itself and in any event, is selected so as not to melt or sublimate at the high temperatures at which the carbon is intended to be used. Thus, the coating provides a barrier which entrains the carbon, even at temperatures at which it would normally vaporize rapidly.

Figure 2:
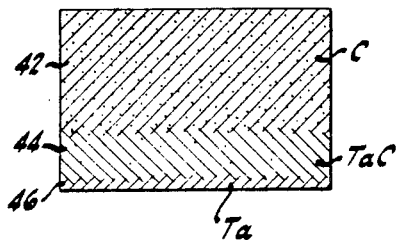

Other objects and advantages of this invention will become apparent from the specification following when read in connection with the accompanying drawings wherein:

FIG. 1 is a front elevation view, partially in section of a furnace constructed to practice the method of this invention; and FIG. 2 is an enlarged partial section view of the product of the method of FIG. 1.

Referring now to the drawing with greater particularly, a preferred form of furnace would include a sealed enclosure or envelope 10 having a suitable source of heat as, for example, one or more electron guns indicated generally at 12. It is preferred that the electron guns be spaced from the metal being bombarded thereby in order to reduce the possibility of damage or short circuiting of the guns as a result of invasion by ions of the metal or released gases. As shown, the electron gun 12 is positioned laterally and below the open top of the crucible 14 in which the material is melted and vaporized. With the gun 12 so placed, the electron beam 15 projected from the gun 12 may be guided into the open top of the crucible 14 under the influence of a magnetic field generated between pole faces 16 of a magnet 17 including a winding 18. In FIG. 1, the electron beam 15 shown is guided by the magnetic field over and down into the open top of the crucible 14. If desired, the crucible 14 may be cooled by some suitable means such as by the circulation of water through a jacket 19 provided around the crucible.

In open communication with the furnace envelope 10 are evacuation chambers 22 into which vacuum pumps 24 evacuate the envelope 10 through large ducts or windows 26. The furnace envelope is in this way maintained under a high degree of vacuum throughout the process, and, desirably, this vacuum is of the order of $10^{-5}$ millimeters of mercury.

A carbon body 28 which preferably has previously been formed as desired for its intended use, for example as a heating element, is positioned within the confines of the furnace enclosure 10, as by means of a hanger 29.

In the furnace thus described, the coating process is initiated by placing or feeding a suitable metal 30 into the crucible 14, by any suitable means (not shown). The metal selected is one that forms a carbide that is of solid, imperforate form and which does not melt or sublimate appreciably below temperatures to which the carbon body is to be heated. Many metals, including the refractory metals, hafnium, molybdenum, niobium, tantalum, thorium, titanium, tungsten, uranium, vanadium and zirconium form carbides which meet these requirements. The metal selected is heated, as by bombardment by the electron beam, to a temperature at which it vaporizes rapidly and a steady stream 34 of metal vapor molecules is produced. Generally, for the refractory metals previously named rapid vaporization occurs at temperatures ranging from 100° to 500° centigrade above the melting point of the metal. Consequently, a molten pool 32 of the metal may first be formed at the top of the crucible 14.

At the extremely high conditions of vacuum that exist within the furnace enclosure 10, the vaporization is conducted under ideal circumstances. The almost total absence of foreign molecules above the surface of the molten pool 32 virtually eliminates the possibility of molecule collision that might otherwise tend to scatter the metal vapor molecules 34 over the furnace. The vapor molecules 34 are released uniformly from the surface of the molten pool 32 with few being driven back into the pool by collision, and nearly all travel toward the carbon body 28 in fixed unimpeded paths to impinge evenly over the surface of the carbon body to be coated. At a vacuum of $10^{-5}$ millimeters of mercury, the mean-free path for molecules is approximately 20 feet and, since the distance the vapor molecules here travel from crucible to the carbon is but a fraction of that mean-free path, molecule collision is not a significant factor in the process. Therefore, since the molecules are released evenly over the surface of the molten pool 32 and travel in fixed paths to impinge against the carbon, uniformity and continuity of coating can be achieved practicably.

In the meantime, the carbon is itself heated to a temperature at which reaction with the vapor molecules 34 is promoted and accelerated. For this purpose, any suitable heating source such as the heating element shown generally at 40, is provided in the area in which the carbon body 28 is supported within the furnace enclosure. Alternatively, the carbon body 28 could be heated internally by passing an electric current through it, but in any event, the carbon is raised to a temperature at which reaction with the vapor molecules 34 occurs at a satisfactory rate, usually above about 1400° C. Most satisfactory results have been achieved with the carbon heated to approximately 2000° C., and at about 2300° C. carbon commences to vaporize at such a rapid rate that it prevents satisfactory deposition of the metal vapor molecules. Thus, with the carbon heated to a temperature at which it will readily react with the metallic vapor 34, the molecules which impinge upon the carbon uniformly over the surface thereof to form, with the carbon a complete and continuous coating of the metal carbide which encases the carbon body to form an effective vapor barrier thereon.

In performing the method of this invention, the carbon body 28 is first formed in the shape desired and then, in the embodiment shown, positioned within the furnace envelope on the hangers 29 where it is heated by the heating element 40 to a reaction temperature below that at which it vaporizes readily. In the meantime, power is fed to the electron gun 12 and the surface of the metal 30 within the crucible is bombarded by the electron beam 15 to raise the temperature of the metal to rapid vaporization. In the refractory metals which are found to be particularly satisfactory for this process, a suitable rate of vaporization occurs at a temperature above the melting point of the metal. For example, in forming a vapor barrier of tantalum carbide, over the carbon body, the tantalum having a melting point of approximately 3025° C. is heated to above 3150° for rapid vaporization. In the extremely high vacuum, the tantalum vapor molecules travel uniformly from the surface of the molten tantalum to deposit upon the carbon body. Since the carbon 42 (FIG. 2) is at a temperature at which reaction takes place readily, the outer molecules of the carbon combine with the metal vapor molecules impinging thereupon to form a microscopic outer coating of tantalum carbide 44. The vaporization of the metal is continued until the impermeable vapor barrier of tantalum carbide 44 is complete, after which a deposit 46 of substantially pure tantalum collects on the outside of the tantalum carbide vapor barrier.

The tantalum carbide is extremely stable at high temperatures, and has a melting point of approximately 850° higher than that of the pure tantalum. Similarly, hafnium carbide has little tendency to sublime at high temperatures and, while hafnium has a melting point of approximately 2210°, its melting point is approximately 3890° C.; thorium with a melting point somewhat above 3000° C. forms thorium carbide with a melting point of 5000° C.; titanium with a melting point of approximately 1800° C. forms titanium carbide with a melting point of 3150° C.; vanadium with a melting point of 1710° C. forms vanadium carbide with a melting point of 2810° C.; niobium with a melting point of 1950° C. forms niobium carbide which melts at 3900° C.; and zirconium with a melting point of approximately 1900° C. forms zirconium carbide with a melting point of approximately 3540° C. Since the carbon is literally encased in a continuous, imperforate coating of a material having an extreme stability at high temperatures, the coating remains intact to entrain carbon vapors that might be produced. Such a vapor barrier conditions the carbon for use as a high temperature heating element, or in other capacities under conditions of temperatures at which it would otherwise be sublimated.

It is to be understood that modifications and changes to the process may be made without departing from the spirit and scope of this invention which is defined by the claims appended hereto.

What is claimed is:

1. The method of forming in situ a metal carbide vapor barrier on the surface of a carbon body so as to provide a carbon body that is resistant to vaporization at high temperatures, which method comprises placing the carbon body in a furnace chamber containing in spaced relation thereto a metal capable of reacting with carbon to form a solid, non-porous metal carbide that is substantially stable at a temperature of 2500° C., evacuating the furnace chamber to a high vacuum and heating the carbon body to a temperature between about 1300° C. and 2300° C., separately heating the metal to a temperature at which the metal vaporizes rapidly, said temperature being above the temperature of the carbon body, depositing the vaporized metal on the surface of the hot carbon body, and continuing the vaporization of the metal until a continuous imperforate layer of metal carbide is formed in situ on the surface of the carbon body.

2. The method of forming in situ a refractory metal carbide vapor barrier on the surface of a carbon body so as to provide a carbon body that is resistant to vaporization at high temperatures, which method comprises placing the carbon body in a furnace chamber containing in spaced relation thereto a refractory metal capable of reacting with carbon to form a solid, non-porous refractory metal carbide that is substantially stable at a temperature of 2500° C., the refractory metal being selected from the group consisting of hafnium, tantalum, molybdenum, niobium, thorium, titanium, tungsten, uranium, vanadium, and zirconium, evacuating the furnace chamber to a high vacuum and heating the carbon body to a temperature between about 1300° C. and 2300° C., separately heating the refractory metal to a temperature at which the refractory metal vaporizes rapidly, said temperature being above the temperature of the carbon body, depositing the vaporized refractory metal on the surface of the hot carbon body, and continuing the vaporization of the metal until a continuous imperforate layer of refractory metal carbide is formed in situ on the surface of the carbon body.

3. The method of forming in situ a refractory metal carbide vapor barrier on the surface of a carbon body so as to provide a carbon body that is resistant to vaporization at high temperatures, which method comprises placing the carbon body in a furnace chamber containing in spaced relation thereto a refractory metal capable of reacting with carbon to form a solid, non-porous refractory metal carbide that is substantially stable at a temperature of 2500° C., the refractory metal being selected from the group consisting of hafnium, tantalum, molybdenum, niobium, thorium, titanium, tungsten, uranium, vanadium and zirconium, evacuating the furnace chamber to a high vacuum and heating the carbon body to a temperature between about 1300° C. and 2300° C., separately heating the refractory metal to a temperature at which the refractory metal vaporizes rapidly, said temperature being above the temperature of the carbon body, depositing the vaporized refractory metal on the surface of the hot carbon body, and continuing the vaporization of the refractory metal until a continuous imperforate layer of refractory metal carbide is formed in situ on the surface of the carbon body.

4. The method of forming in situ a refractory metal carbide vapor barrier on the surface of a carbon body so as to provide a carbon body that is resistant to vaporization at high temperature, which method comprises placing the carbon body in a furnace chamber containing in spaced relation thereto a refractory metal capable of reacting with carbon to form a solid, non-porous refractory metal carbide that is substantially stable at a temperature of 2500° C., the refractory metal being selected from the group consisting of hafnium, tantalum, molybdenum, niobium, thorium, titanium, tungsten, uranium, vanadium, and zirconium, evacuating the furnace chamber to a pressure of not more than about $10^{-5}$ millimeters of mercury and heating the carbon body at a temperature between about 1300° C. and 2300° C., separately heating the refractory metal to a temperature at which the refractory metal vaporizes rapidly, said temperature being above the temperature of the carbon body, depositing the vaporized refractory metal on the surface of the hot carbon body, and continuing the vaporization of the refractory metal until a continuous imperforate layer of refractory metal carbide is formed in situ on the surface of the carbon body.

5. The method of forming in situ a refractory metal carbide vapor barrier on the surface of a carbon body so as to provide a carbon body that is resistant to vaporization at high temperature, which method comprises placing the carbon body in a furnace chamber containing in spaced relation thereto a refractory metal capable of reacting with carbon to form a solid, non-porous refractory metal carbide that is substantially stable at a temperature of 2500° C., the refractory metal being selected from the group consisting of hafnium, tantalum, molybdenum, niobium, thorium, titanium, tungsten, uranium, vanadium, and zirconium, evacuating the furnace chamber to a pressure of not more than about $10^{-5}$ millimeters of mercury and heating the carbon body at a temperature between about 1300° C. and 2300° C., separately heating the refractory metal to a temperature at which the refractory metal vaporizes rapidly, said temperature being above the temperature of the carbon body, depositing the vaporized refractory metal on the surface of the hot carbon body until a continuous imperforate layer of refractory metal carbide is formed in situ on the surface of the carbon body, and continuing the vaporization of the refractory metal until a layer of refractory metal is deposited on the surface of the refractory metal carbide layer.

6. The method of forming in situ a refractory metal carbide vapor barrier on the surface of a carbon body so as to provide a carbon body that is resistant to vaporization at high temperature, which method comprises placing the carbon body in a furnace chamber containing in spaced relation thereto a refractory metal capable of reacting with carbon to form a solid, non-porous refractory metal carbide that is substantially stable at a temperature of 2500° C., the refractory metal being selected from the group consisting of hafnium, tantalum, molybdenum, niobium, thorium, titanium, tungsten, uranium, vanadium, and zirconium, evacuating the furnace chamber to a pressure of not more than about $10^{-5}$ millimeters of mercury and heating the carbon body at a temperature between about 1300° C. and 2300° C., separately heating the refractory metal by electron bombardment with an electron beam to a temperature at which the refractory metal vaporizes rapidly, said temperature being above the temperature of the carbon body, depositing the vaporized refractory metal on the surface of the hot carbon body, and continuing the vaporization of the refractory metal until a continuous imperforate layer of refractory metal carbide is formed in situ on the surface of the carbon body.

References Cited by the Examiner

UNITED STATES PATENTS

| | | |
|---|---|---|
| 2,282,098 | 5/1942 | Taylor. |
| 2,703,334 | 3/1955 | Clough et al. _____ 117—228 X |
| 2,860,075 | 11/1958 | Alexander et al. __ 117—228 X |
| 2,932,588 | 4/1960 | Frank _____ 117—106 |
| 2,972,556 | 2/1961 | Vrahiotes _____ 117—228 X |
| 3,046,936 | 7/1962 | Simons _____ 118—49.1 |

RICHARD D. NEVIUS, *Primary Examiner*